US009718150B2

(12) United States Patent
Nako et al.

(10) Patent No.: US 9,718,150 B2
(45) Date of Patent: Aug. 1, 2017

(54) WELD METAL EXCELLENT IN HYDROGEN EMBRITTLEMENT RESISTANCE

(75) Inventors: Hidenori Nako, Kobe (JP); Takuya Kochi, Kobe (JP); Wataru Urushihara, Kobe (JP); Munenobu Sato, Fujisawa (JP); Yoshihiko Kitagawa, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 684 days.

(21) Appl. No.: 13/982,761

(22) PCT Filed: Feb. 1, 2012

(86) PCT No.: PCT/JP2012/052305
§ 371 (c)(1),
(2), (4) Date: Jul. 31, 2013

(87) PCT Pub. No.: WO2012/105617
PCT Pub. Date: Aug. 9, 2012

(65) Prior Publication Data
US 2013/0315777 A1  Nov. 28, 2013

(30) Foreign Application Priority Data

Feb. 2, 2011 (JP) .................................. 2011-021153
Aug. 25, 2011 (JP) .................................. 2011-184117

(51) Int. Cl.
| B23K 35/30 | (2006.01) |
| B23K 35/02 | (2006.01) |
| C22C 38/14 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/44 | (2006.01) |
| C22C 38/50 | (2006.01) |
| C22C 38/58 | (2006.01) |
| C22C 1/02 | (2006.01) |

(52) U.S. Cl.
CPC ...... *B23K 35/3093* (2013.01); *B23K 35/0266* (2013.01); *B23K 35/30* (2013.01); *B23K 35/3053* (2013.01); *B23K 35/3066* (2013.01); *B23K 35/3073* (2013.01); *B23K 35/3086* (2013.01); *C22C 1/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/44* (2013.01); *C22C 38/50* (2013.01); *C22C 38/58* (2013.01)

(58) Field of Classification Search
CPC .............. B23K 35/0266; B23K 35/30; B23K 35/3053; B23K 35/3066; B23K 35/3073; B23K 35/3086; B23K 35/3093; C22C 1/02; C22C 38/001; C22C 38/002; C22C 38/02; C22C 38/04; C22C 38/06; C22C 38/08; C22C 38/12; C22C 38/14; C22C 38/44; C22C 38/50; C22C 38/58
See application file for complete search history.

(56) References Cited

U.S. PATENT DOCUMENTS

| 2005/0016980 A1 | 1/2005 | Hara et al. | |
| 2005/0155960 A1* | 7/2005 | Bonnet | B23K 26/1429 219/137 WM |
| 2011/0250471 A1 | 10/2011 | Hara et al. | |

FOREIGN PATENT DOCUMENTS

| CN | 101918607 A | 12/2010 |
| JP | 11-147196 A | 6/1999 |
| JP | 2000-061687 A | 2/2000 |
| JP | 2002-115032 A | 4/2002 |
| JP | 2003-033876 A | 2/2003 |
| JP | 2004-025304 A | 1/2004 |
| JP | 2005-40816 A | 2/2005 |
| JP | 2008-000808 A | 1/2008 |
| JP | 2011-005531 A | 1/2011 |
| WO | WO 2009/075542 A2 | 6/2009 |
| WO | 2009/082162 A2 | 7/2009 |
| WO | 2010/055788 A1 | 5/2010 |
| WO | 2010/110387 A1 | 9/2010 |

OTHER PUBLICATIONS

International Search Report issued Apr. 24, 2012 in PCT/JP2012/052305.

Extended European Search Report issued on Jun. 28, 2016 in PCT/JP2012/052305 filed Feb. 1, 2012.

* cited by examiner

*Primary Examiner* — Roy King
*Assistant Examiner* — Caitlin Kiechle
(74) *Attorney, Agent, or Firm* — Oblon, McClelland, Maier & Neustadt, L.L.P.

(57) ABSTRACT

Disclosed is a weld metal which is formed by gas-shielded arc welding using a flux-cored wire, and which has a specific chemical composition, in which retained austenite particles are present in a number density of 2500 per square millimeter or more and in a total volume fraction of 4.0% or more based on the total volume of entire structures of the weld metal. The weld metal has excellent hydrogen embrittlement resistance and is resistant to cracking at low temperatures even when the weld metal has a high strength.

18 Claims, 2 Drawing Sheets

(IN mm)

F I G . 4
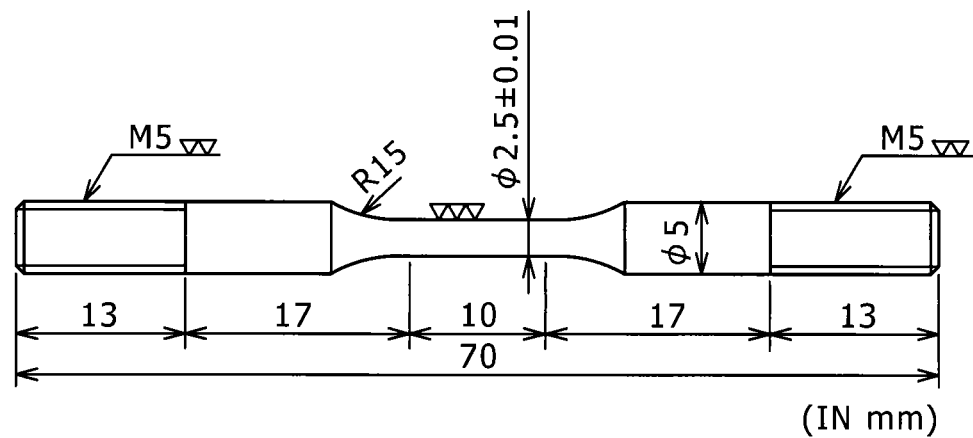
(IN mm)
F I G . 5
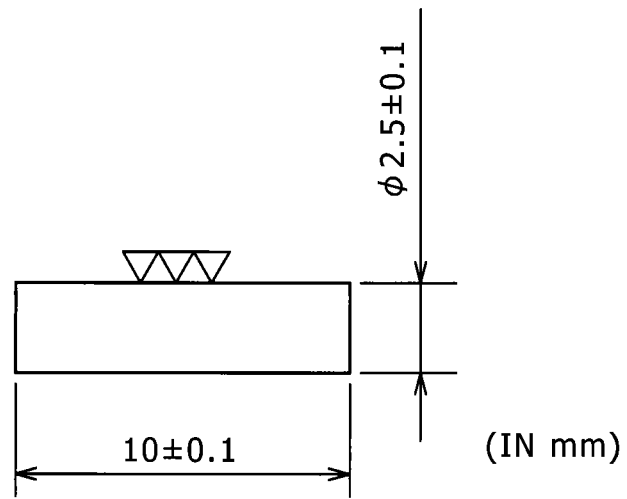
(IN mm)

WELD METAL EXCELLENT IN HYDROGEN EMBRITTLEMENT RESISTANCE

TECHNICAL FIELD

The present invention relates to weld metals for use in welded structures, which are less susceptible to hydrogen embrittlement.

BACKGROUND ART

Welding of high-tensile steels should be performed under strict control of a preheating/interpass temperature so as to prevent cold cracking of weld beads (weld metals), thus causing reduction in operation efficiency. Steels for use in welded structures have had higher and higher strengths, and weld metals should have higher strengths. Typically, high-tensile steels of HT780 class having a high tensile strength on the order of 780 MPa have been used.

Such increase in strength may tend to cause reduction in cold cracking resistance. To avoid this, weld metals should have better cold cracking resistance. In particular, gas-shielded arc welding using a flux-cored wire is employed because of exhibiting excellent weldability, and a weld metal formed by this welding technique should surely have satisfactory cold cracking resistance.

The cold cracking is probably caused by segregation of diffusible hydrogen at a grain boundary to reduce the grain boundary strength (hereinafter this phenomenon is also called as "hydrogen embrittlement"). Accordingly, an improvement in cold cracking resistance may significantly depend on reduction in diffusible hydrogen.

The improvement in cold cracking resistance of a weld metal requires reduction in susceptibility to hydrogen embrittlement of the weld metal, and various techniques have been proposed from this viewpoint.

Typically, PTL 1 discloses a technique of dispersing a molybdenum carbide (carbide containing Mo) in a weld metal so as to prevent cold cracking, because such molybdenum carbide can satisfactorily trap hydrogen. This technique, however, is not applicable to regular welding of steels, because it requires a special welding technique in which steels are butted to each other, and submerged arc welding is performed from the inner wall, so as to disperse the molybdenum carbide.

PTL 2 proposes a technique of controlling the cooling time during welding operation so as to prevent cold cracking. This technique, however, disadvantageously requires strict operation control according to its chemical composition and suffers from a high work load.

PTL 3 proposes a technique of allowing a weld metal to have a retained austenite fraction of 1% or more so as to prevent cold cracking, because the retained austenite will trap diffusible hydrogen. This technique, however, presupposes double one layer seam welding and is not applicable to regular welding of steels.

PTL 4 proposes a technique of reducing the amount of diffusible hydrogen and suitably controlling the strength and chemical composition of a weld metal so as to improve cold cracking resistance of the weld metal. Even this technique, however, is applicable to limited areas in actual welding operations, because a strength at satisfactory level obtained according to this technique is affected by the chemical composition.

Such proposed techniques are each intended to improve cold cracking resistance, but there more essentially needs improvement in hydrogen embrittlement resistance of a weld metal, because the amount of hydrogen in the weld metal can be increased by various factors in actual welding operations.

High-tensile steels of HT780 class have been more and more applied to weld metals for use in offshore structures. These weld metals require not only hydrogen embrittlement resistance and strength but also low-temperature toughness at high levels so as to endure use in cold climate areas.

CITATION LIST

Patent Literature

PTL 1: Japanese Unexamined Patent Application Publication (JP-A) No. 2005-40816
PTL 2: JP-A No. 2003-33876
PTL 3: JP-A No. 2002-115032
PTL 4: JP-A No. H11-147196

SUMMARY OF INVENTION

Technical Problem

The present invention has been made under such circumstances, and an object thereof is to provide a weld metal which is satisfactorily resistant to hydrogen embrittlement and cold cracking even having a high strength. Another object of the present invention is to provide a weld metal which has satisfactory low-temperature toughness according to necessity in addition to the above properties.

Solution to Problem

The present invention has been achieved the objects and provides a weld metal formed by gas-shielded arc welding using a flux-cored wire, the weld metal including: C in a content of 0.02% to 0.12%; Si in a content of 0.10% to 2.0%; Mn in a content of 0.90% to 2.5%; Ni in a content of 0.20% to 3.5%; Mo in a content of 0.05% to 1.5%; Ti in a content of 0.040% to 0.150%; N in a content of more than 0% and less than or equal to 0.015%; and O in a content of 0.030% to 0.10%,
in mass percent,
wherein:
the weld metal further includes iron and inevitable impurities;
retained austenite particles are present in a number density of 2500 per square millimeter or more and are present in a total volume fraction of 4.0% or more based on the total volume of entire structures of the weld metal. Retained austenite particles to be measured in the measurement of the number density are those having a size equal to or larger than a measurement limit (having an equivalent circle diameter of more than 0.15 μm).

The weld metal according to the present invention may effectively have a Si content of 0.10% to 0.5% and a Ni content of 1.0% to 2.0% and have an α value as specified by Expression (1) of 3.2 or more. This may allow the weld metal to excel also in low-temperature toughness. Specifically, this weld metal may have an impact energy absorption at −40° C. $vE_{-40}$ of more than 85 J. Expression (1) is expressed as follows:

$$\alpha \text{ value} = [Mn] + [Ni] + (2 \times [Mo]) + (16 \times [Ti]) - (12 \times [O]) \quad (1)$$

where [Mn], [Ni], [Mo], [Ti], and [O] are contents (in mass percent) of Mn, Ni, Mo, Ti, and O, respectively.

In a preferred embodiment of the weld metal according to the present invention, oxide particles each containing 20 percent by mass or more of Ti and having an equivalent circle diameter of 0.15 to 1.0 μm are present in a number density of 5000 per square millimeter or more. As used herein the term "equivalent circle diameter" refers to a diameter of an assumed circle having an equivalent area to that of a retained austenite particle or oxide particle as observed on an observed surface under an optical microscope.

In preferred embodiments, the weld metal according to the present invention may further contain one or more other elements such as (a) at least one element selected from the group consisting of Cr in a content of more than 0% and less than or equal to 2.0%, V in a content of more than 0% and less than or equal to 0.60%, Nb in a content of more than 0% and less than or equal to 0.15%, and Cu in a content of more than 0% and less than or equal to 1.0%; (b) at least one element selected from the group consisting of Al in a content of more than 0% and less than or equal to 0.020% and Zr in a content of more than 0% and less than or equal to 0.10%; (c) B in a content of more than 0% and less than or equal to 0.0050%. The weld metal can have further better property or properties according to the type(s) of element(s) to be contained.

Advantageous Effects of Invention

The present invention suitably controls not only the chemical composition but also the number density and total volume fraction of retained austenite particles and can thereby give a weld metal having excellent hydrogen embrittlement resistance. The present invention, when further strictly controlling the contents of Si and Ni and allowing the contents of Mn, Ni, Mo, Ti, and O to satisfy the predetermined relational expression, can give a weld metal also having excellent low-temperature toughness in addition to the properties.

BRIEF DESCRIPTION OF DRAWINGS

FIG. 4 is an explanatory drawing illustrating a shape of a specimen for use in a tensile test.

FIG. 5 is an explanatory drawing illustrating a shape of a specimen for use in measurement of absorbed hydrogen content.

DESCRIPTION OF EMBODIMENTS

Figure 1:
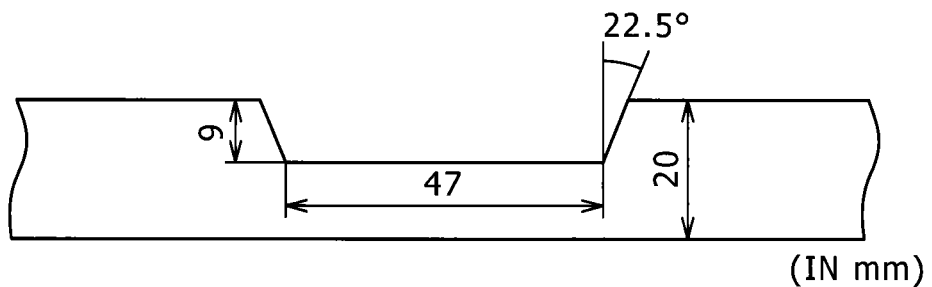
FIG. 1 is a schematic explanatory drawing illustrating a groove geometry upon formation of a weld metal.

The present inventors made various investigations to improve hydrogen embrittlement resistance of a high-strength weld metal which is formed by gas-shielded arc welding using a flux-cored wire and has a high tensile strength of HT780 class. As a result, the present inventors have found that the high-strength weld metal can have better hydrogen embrittlement resistance by allowing the weld metal to contain retained austenite particles in a predetermined number density, because such retained austenite particles serve as diffusible-hydrogen-trapping sites. The present invention has been made based on these findings.

Specifically, the present inventors have found that a weld metal having a high tensile strength of HT780 class can have better hydrogen embrittlement resistance by controlling the weld metal to have a chemical composition within a predetermined range and to contain retained austenite particles present in a number density of 2500 per square millimeter or more and in a total volume fraction (proportion based on the entire structures) of 4.0% or more.

Reduction in diffusible hydrogen effectively contributes to satisfactory hydrogen embrittlement resistance. The presence of retained austenite has been known to effectively contribute to reduction in diffusible hydrogen. Customary investigations, however, focus not always on optimum dispersion form of retained austenite but chiefly solely on the amount thereof. Under such circumstances, the present inventors have made investigations on not only the amount of retained austenite but also the number density thereof, as a technique for providing significantly better hydrogen embrittlement resistance.

As a result, the present inventors have found that a weld metal can have significantly better hydrogen embrittlement resistance when retained austenite serving as diffusible-hydrogen-trapping sites is allowed to present in a certain amount, and the matrix structure is allowed to be finer to disperse the retained austenite particles in a high density to exhibit greatest trapping effects.

Specifically, a weld metal according to an embodiment of the present invention contains retained austenite particles in a number density of 2500 per square millimeter or more and in a total volume fraction of 4.0% or more based on the total volume of entire structures of the weld metal and can thereby be less susceptible to hydrogen embrittlement (be more resistant to hydrogen embrittlement). The retained austenite particles may be present in a number density of preferably 3000 per square millimeter or more and more preferably 3300 per square millimeter or more and in a total volume fraction of preferably 4.5% or more and more preferably 4.8% or more.

The present inventors have further found that the weld metal can also have satisfactory low-temperature toughness when having a Si content of 0.10% to 0.5% and a Ni content of 1.0% to 2.0% and having an α value as specified by Expression (1) of 3.2 or more, where Expression (1) is expressed as follows:

$$\alpha \text{ value} = [Mn] + [Ni] + (2 \times [Mo]) + (16 \times [Ti]) - (12 \times [O]) \quad (1)$$

where [Mn], [Ni], [Mo], [Ti], and [O] are contents (in mass percent) of Mn, Ni, Mo, Ti, and O, respectively.

Specifically, reduction in coarse grain-boundary ferrite grains formed at prior austenite grain boundary is required for ensuring low-temperature toughness at a certain level. Elements Mn, Ni, Mo, and Ti defining the α value expressed by Expression (1), when present as solutes in a solid solution, contribute to suppression in grain-boundary ferrite formation. Part of Mn and Ti form oxides, and reduction in oxygen (O) allows these elements to be present as solutes in larger amounts. The present inventors have experimentally determined coefficients of the respective elements and have found that the weld metal, when having an α value of 3.2 or more, may have better low-temperature toughness while containing a smaller amount of grain-boundary ferrite.

Next, chemical compositions of the weld metal according to the present invention will be described. The weld metal according to the present invention is also importantly controlled in its chemical compositions. Ranges of the chemical compositions are specified for reasons as follows.

[C: 0.02% to 0.12%]

Carbon (C) element is essential for satisfactory strengths of the weld metal. To exhibit such effects, carbon may be contained in a content of 0.02% or more, preferably 0.04% or more, and more preferably 0.06% or more. However, carbon, if contained in a content of more than 0.12%, may cause the weld metal to have excessively high strengths to thereby have higher hydrogen embrittlement susceptibility (lower hydrogen embrittlement resistance). Carbon may be contained in a content of preferably 0.10% or less and more preferably 0.08% or less in terms of its upper limit.

[Si: 0.10% to 2.0%]

Silicon (Si) element, when present as a solute, serves to retard carbide formation and to stabilize retained austenite. Si, if contained in a content of less than 0.10%, may fail to help the weld metal to contain retained austenite in a sufficient amount. Si may be contained in a content of preferably 0.25% or more and more preferably 0.28% or more. However, Si, if contained in an excessively high content, may cause the weld metal to have excessively high strengths and to thereby have higher hydrogen embrittlement susceptibility. To avoid these, the Si content may be controlled to 2.0% or less, preferably 1.5% or less, and more preferably 0.5% or less. Particularly for satisfactory low-temperature toughness of the weld metal, the Si content is preferably 0.5% or less and furthermore preferably 0.4% or less. Specifically, Si, if contained in a content of more than 0.5%, may cause the formation of hard martensite-austenite constituent, and this may cause fracture to thereby often cause the weld metal to have poor low-temperature toughness.

[Mn: 0.90% to 2.5%]

Manganese (Mn) element is necessary for helping the weld metal to have strengths at certain levels. To exhibit such effects, Mn may be contained in a content of 0.90% or more, preferably 1.2% or more, and more preferably 1.5% or more. However, Mn, if contained in an excessively high content of more than 2.5%, may cause the weld metal to have excessively high strengths to thereby have higher hydrogen embrittlement susceptibility. Mn may be contained in a content of preferably 2.2% or less and more preferably 2.0% or less.

[Ni: 0.20% to 3.5%]

Nickel (Ni) element is necessary for helping the weld metal to have strengths at certain levels. To exhibit such effects, Ni may be contained in a content of 0.20% or more, preferably 0.5% or more, and more preferably 1.0% or more. However, Ni, if contained in an excessively high content of more than 3.5%, may cause the weld metal to have excessively high strengths to thereby have higher hydrogen embrittlement susceptibility. Ni may be contained in a content of preferably 3.0% or less and more preferably 2.8% or less. Particularly for satisfactory low-temperature toughness of the weld metal, Ni may be contained in a content of preferably 1.0% or more and 2.0% or less, and more preferably 1.1% or more and 1.8% or less. Ni allows the weld metal to have a lower fracture appearance transition temperature and to thereby have a higher Charpy impact strength at low temperatures. To exhibit such effects, Ni is preferably contained in a content of 1.0% or more. However, Ni, if contained in a content of more than 2.0%, may cause the weld metal to contain martensite in a larger amount, thereby have higher strengths, and have a lower Charpy impact strength.

[Mo: 0.05% to 1.5%]

Molybdenum (Mo) element is necessary for helping the weld metal to have higher strengths. To exhibit such effects, Mo may be contained in a content of 0.05% or more, preferably 0.10% or more, and more preferably 0.2% or more. However, Mo, if contained in an excessively high content of more than 1.5%, may cause the weld metal to have higher hydrogen embrittlement susceptibility due to excessively high strengths. Mo may be contained in a content of preferably 1.0% or less and more preferably 0.50% or less.

[Ti: 0.040% to 0.150%]

Titanium (Ti) element forms oxides causing intragranular transformation, allows the structure to be finer, and thereby contributes to high-density dispersion of retained austenite particles. To exhibit such effects, Ti may be contained in a content of 0.040% or more, preferably 0.050% or more, and more preferably 0.055% or more. However, Ti, if contained in an excessively high content of more than 0.150%, may cause the weld metal to have higher hydrogen embrittlement susceptibility due to excessively high strengths. Ti may be contained in a content of preferably 0.12% or less and more preferably 0.08% or less.

[N: more than 0% and less than or equal to 0.015%]

Nitrogen (N) element is inevitably contaminated and is effective for allowing the weld metal to have higher strengths. However, nitrogen, if contained in an excessively high content, may cause the weld metal to have higher hydrogen embrittlement susceptibility due to excessively high strengths. To avoid these, nickel may be contained in a content of 0.015% or less, preferably 0.010% or less, and more preferably 0.006% or less. It is industrially difficult to allow the weld metal to have a nitrogen content of 0%.

[O: 0.030% to 0.10%]

Oxygen (O) element forms oxides causing intragranular transformation, allows the structure to be finer, and thereby contributes to high-density dispersion of retained austenite particles. To exhibit such effects, oxygen may be contained in a content of 0.030% or more, preferably 0.035% or more, and more preferably 0.040% or more. However, oxygen, if contained in an excessively high content of more than 0.10%, may form silicon oxides to reduce solute silicon, and may fail to ensure a sufficient amount of retained austenite. Oxygen may be contained in a content of preferably 0.080% or less and more preferably 0.060% or less.

The weld metal according to the present invention may contain elements as above and further contain iron and inevitable impurities. The inevitable impurities may be elements (e.g., P and S) that are brought into the weld metal typically from raw materials, construction materials, and manufacturing facilities. Such impurities, however, generally segregate at grain boundaries, thereby lower grain boundary strengths, and accelerate cold cracking. To avoid these, phosphorus (P) and sulfur (S) contents are preferably controlled to more than 0% and less than or equal to 0.02% and more than 0% and less than or equal to 0.025%, respectively.

The weld metal according to the present invention preferably further contains one or more additional elements such as (a) at least one element selected from the group consisting of Cr in a content of more than 0% and less than or equal to 2.0%, V in a content of more than 0% and less than or equal to 0.60%, Nb in a content of more than 0% and less than or equal to 0.15%, and Cu in a content of more than 0% and less than or equal to 1.0%; (b) at least one element selected from the group consisting of Al in a content of more than 0% and less than or equal to 0.020% and Zr in a content of more than 0% and less than or equal to 0.10%; and (c) B in a content of more than 0% and less than or equal to 0.0050%. The weld metal may have a better property according to the type of an element to be contained. These elements may be contained in amounts as follows.

[At least one element selected from the group consisting of Cr in a content of more than 0% and less than or equal to 2.0%, V in a content of more than 0% and less than or equal to 0.60%, Nb in a content of more than 0% and less than or equal to 0.15%, and Cu in a content of more than 0% and less than or equal to 1.0%]

Chromium (Cr), vanadium (V), niobium (Nb), and copper (Cu) elements contribute to better strengths of the weld metal. However, these elements, if contained in excessively high contents, may cause the weld metal to have higher hydrogen embrittlement susceptibility due to excessively high strengths. To avoid these, the elements may be controlled so that the Cr content is preferably 2.0% or less, more preferably 1.5% or less, and furthermore preferably 1.0% or less; the V content is preferably 0.60% or less, more preferably 0.50% or less, and furthermore preferably 0.40% or less; the Nb content is preferably 0.15% or less, more preferably 0.10% or less, and furthermore preferably 0.08% or less; and the Cu content is preferably 1.0% or less, more preferably 0.5% or less, and furthermore preferably 0.2% or less, respectively. To exhibit the aforementioned effects, the Cr content is preferably 0.05% or more, the V content is preferably 0.02% or more, the Nb content is preferably 0.01% or more, and the Cu content is preferably 0.05% or more in terms of their lower limits.

[Al in a content of more than 0% and less than or equal to 0.020% and/or Zr in a content of more than 0% and less than or equal to 0.10%]

Aluminum (Al) and zirconium (Zr) elements are strong deoxidizers and serve to more and more increase retained austenite due to increased solute Si. However, these elements, if contained in excessively high contents, may cause reduction in intragranular transformation caused from oxides and cause the weld metal to have higher hydrogen embrittlement susceptibility due to a coarsened structure. To avoid these, Al and Zr may be controlled so that the Al content is preferably 0.020% or less and more preferably 0.018% or less, and the Zr content is preferably 0.10% or less and more preferably 0.06% or less. To exhibit the aforementioned effects, the Al and Zr contents are each preferably 0.010% or more in terms of their lower limits.

[B in a content of more than 0% and less than or equal to 0.0050%]

Boron (B) element suppresses the formation of ferrite at prior austenite grain boundaries and thereby contributes to higher strengths of the weld metal. However, boron, if contained in an excessively high content, may cause the weld metal to have higher hydrogen embrittlement susceptibility due to excessively high strengths. To avoid these, boron may be controlled so that the boron content is preferably 0.0050% or less and more preferably 0.0030% or less. To exhibit the aforementioned effects, the boron content is preferably 0.0010% or more in terms of its lower limit.

As long as being formed by gas-shielded arc welding using a flux-cored wire, the wire chemical composition and welding conditions for the weld metal according to the present invention are not limited. However, there are preferred ranges for specific embodiments as mentioned above.

From such viewpoints, the wire (welding material) preferably has a chemical composition satisfying, for example, all the following conditions. Specifically, the wire including a steel sheath and a flux core preferably has:

(a) a total content of Si present typically as a metal and an oxide of 0.35% to 2.5%;

(b) a content of Si present as another form than oxides of 0.25% or more;

(c) a content of Si present as an oxide of 0.25% or less;

(d) a total content of Ti present typically as a metal and an oxide of 2.5% to 4.5%;

(e) a total content of Al present typically as a metal and an oxide of 0.10% or more;

(f) a total content of Zr present typically as a metal and an oxide of 0.035% or more;

(g) a content of Mg present as a metal of 0.4% or more; based on the total mass of the wire including the steel sheath and the flux, (h) an A value as specified by Expression (2) of 0.30 or more, Expression (2) determined from the amounts of total Si, Ti, Al, Zr, and Mg each present typically as a metal and an oxide and expressed as follows:

$$A \text{ value} = Si - [Si/(Ti + 2Al + 2Zr + 3.5Mg)] \quad (2), \text{ and}$$

(i) a ratio [(Mn+Ti)/Si] of the total contents of Mn and Ti (Mn+Ti) to the total content of Si present typically as a metal and an oxide satisfying a condition as specified by Expression (3) as follows:

$$(Mn+Ti)/Si > 4.0 \quad (3)$$

To disperse oxide particles in a number density of 5000 per square millimeter or more, the oxide particles each containing Ti in a content of 20 percent by mass or more and having an equivalent circle diameter of 0.15 to 1.0 μm, the ratio [(Mn+Ti)/Si] preferably satisfies a condition as specified by Expression (4), where the ratio is of the total content of Mn and Ti (Mn+Ti) to the total content of Si present typically as a metal and an oxide. There is no need of limiting other chemical compositions, but control of them is required so as to give a weld metal having a chemical composition within the above-specified range. Expression (4) is expressed as follows:

$$(Mn+Ti)/Si > 10.0 \quad (4)$$

The conditions (a) to (i) are control ranges to ensure the amount of solute silicon that effectively contributes to a larger amount of retained austenite. Specifically, solute silicon in a necessary amount is difficult to be ensured if the conditions (a), (b), and/or (c) is not satisfied, i.e., if the content of Si present as another form than oxides is less than 0.25%, or the content of Si present as oxides is more than 0.25%, or the total content of Si is less than 0.35%.

Even when Si is present in satisfactory forms, solute silicon is reduced due to increased silicon oxides if the content(s) of Ti, Al, Zr, and/or Mg is out of the above-specified range [any of the conditions (d) to (g) is not satisfied], or if the A value is less than 0.30 [the condition (h) is not satisfied]. This is because the elements Ti, Al, Zr, and Mg are more deoxidative than Si.

The higher the Si content (total Si content) and the Ti content are, the better from the viewpoint of ensuring solute silicon in a sufficient amount. However, the contents of Si and Ti in the wire of more than 2.5% and more than 4.5%, respectively, may cause the weld metal to have contents of these elements more than the upper limits of the above-specified ranges.

The condition (i) is specified for ensuring retained austenite particles in a satisfactory number density. Specifically, retained austenite is formed between bainitic laths in bainite serving as a principal structure of the weld metal. For dispersing retained austenite particles in a higher number density, the bainitic structure as a base (matrix) should be finer. Ti—Mn oxide is formed when the compositional ratio satisfies the condition as specified by Expression (3), and this Ti—Mn oxide induces intragranular transformation to thereby allow the bainitic structure to be finer. The Mn—Ti oxide disperses in a high density when the compositional ratio is more than 10.0, and this allows the structure to be furthermore finer, thus contributing to better hydrogen embrittlement resistance.

The welding to form the weld metal is preferably performed under following conditions. Specifically, the welding is preferably performed at a heat input of 2.5 kJ/mm or less using a shielding gas as a gas mixture containing 20% (in volume percent) of $CO_2$ with the remainder being Ar. Welding performed at a heat input of more than 2.5 kJ/mm may cause a lower cooling rate during welding to accelerate the decomposition of retained austenite. The chemical composition of the shielding gas is specified to control the oxide form so as to allow the structure to be finer. The weld metal according to the present invention is formed by welding using a flux-cored wire. The wire to be used generally has a flux filling rate of about 10% to about 20%.

EXAMPLES

The present invention will be illustrated in further detail with reference to several examples below. It should be noted, however, that the examples are by no means construed to limit the scope of the invention; and various changes and modifications without departing from the spirit and scope of the invention are possible and fall within the scope of the invention.

Experimental Example 1

Weld metals were prepared by a procedure as mentioned later using flux-cored wires (welding materials) having a wire diameter of 1.2 mm and a flux filling rate of 13.5% and having chemical compositions given in Tables 1 and 2 below. Properties (tensile strength and hydrogen embrittlement susceptibility) of the weld metals were evaluated. Elements indicated by "-" in Tables 1 and 2 were not added (not contained).

TABLE 1

| Welding material number | Chemical composition (in mass percent) of welding material | | | | | | | | | | | |
|---|---|---|---|---|---|---|---|---|---|---|---|---|
| | C | Si | Mn | Ni | Mo | Ti | N | O | Cr | V | Nb | Cu |
| 1 | 0.11 | 0.90 | 2.6 | 2.53 | 0.15 | 3.26 | 0.002 | 2.40 | — | — | — | — |
| 2 | 0.10 | 0.41 | 2.6 | 2.42 | 0.15 | 3.26 | 0.002 | 2.40 | — | — | — | — |
| 3 | 0.05 | 0.41 | 2.6 | 2.44 | 0.52 | 3.26 | 0.002 | 2.40 | — | — | — | — |
| 4 | 0.10 | 0.41 | 2.2 | 0.55 | 0.15 | 3.26 | 0.002 | 2.40 | 0.42 | — | — | — |
| 5 | 0.10 | 0.41 | 2.2 | 0.55 | 0.15 | 3.26 | 0.002 | 2.40 | 0.85 | — | — | — |
| 6 | 0.10 | 0.90 | 2.2 | 0.56 | 0.15 | 3.26 | 0.002 | 2.40 | 0.80 | — | — | — |
| 7 | 0.10 | 0.41 | 1.9 | 2.61 | 0.15 | 3.26 | 0.002 | 2.40 | 0.80 | — | — | — |
| 8 | 0.15 | 0.41 | 2.2 | 0.59 | 0.15 | 3.26 | 0.002 | 2.40 | 0.75 | — | — | — |
| 9 | 0.14 | 2.03 | 3.8 | 2.53 | 1.01 | 4.46 | 0.002 | 1.75 | — | — | — | — |
| 10 | 0.11 | 0.41 | 2.6 | 2.80 | 0.15 | 3.88 | 0.002 | 2.40 | — | — | — | — |
| 11 | 0.14 | 0.42 | 2.2 | 2.78 | 1.10 | 3.26 | 0.002 | 2.49 | — | — | — | — |
| 12 | 0.11 | 0.41 | 3.0 | 0.81 | 0.15 | 3.26 | 0.002 | 2.40 | — | — | — | — |
| 13 | 0.11 | 0.41 | 2.2 | 0.48 | 0.15 | 3.26 | 0.002 | 2.40 | 0.65 | — | — | — |
| 14 | 0.10 | 0.41 | 2.6 | 3.43 | 0.15 | 3.26 | 0.002 | 2.40 | 0.50 | — | — | — |
| 15 | 0.08 | 0.90 | 2.2 | 1.00 | 0.55 | 3.26 | 0.002 | 2.40 | 0.80 | — | — | — |
| 16 | 0.11 | 0.41 | 2.2 | 1.13 | 0.09 | 3.26 | 0.002 | 2.40 | 0.80 | — | — | — |
| 17 | 0.08 | 0.38 | 2.0 | 2.54 | 0.14 | 3.26 | 0.002 | 2.05 | — | — | — | — |
| 18 | 0.08 | 0.41 | 2.6 | 2.40 | 0.14 | 3.26 | 0.002 | 2.40 | — | 0.40 | — | — |
| 19 | 0.10 | 0.41 | 2.6 | 2.75 | 0.15 | 3.26 | 0.002 | 2.40 | — | — | 0.10 | — |
| 20 | 0.08 | 0.92 | 2.2 | 1.00 | 0.16 | 3.26 | 0.002 | 2.40 | 0.95 | — | — | 0.16 |
| 21 | 0.07 | 0.37 | 1.8 | 1.55 | 0.14 | 3.26 | 0.002 | 2.05 | — | — | — | — |
| 22 | 0.11 | 0.41 | 2.3 | 0.58 | 0.14 | 3.26 | 0.002 | 2.40 | 1.85 | — | — | — |
| 23 | 0.09 | 0.40 | 2.6 | 2.42 | 0.15 | 3.26 | 0.002 | 2.40 | — | 0.55 | — | — |
| 24 | 0.11 | 0.82 | 1.4 | 1.60 | 0.33 | 3.26 | 0.002 | 2.40 | 1.15 | — | — | — |
| 25 | 0.10 | 0.40 | 2.2 | 0.55 | 0.14 | 3.26 | 0.002 | 2.40 | 0.60 | — | — | — |
| 26 | 0.11 | 0.90 | 2.6 | 2.53 | 0.14 | 3.06 | 0.002 | 2.21 | — | — | 0.18 | — |
| 27 | 0.08 | 0.41 | 2.2 | 1.00 | 0.16 | 3.26 | 0.002 | 2.40 | 0.95 | — | — | 0.70 |
| 28 | 0.11 | 0.81 | 1.4 | 1.60 | 0.33 | 3.26 | 0.002 | 2.40 | — | — | — | — |
| 29 | 0.10 | 0.40 | 2.2 | 0.52 | 0.14 | 3.26 | 0.002 | 2.40 | 0.85 | — | — | — |

| Welding material number | Chemical composition (in mass percent) of welding material | | | | | A value | (Ti + Mn)/ Si | Metal silicon | $SiO_2$ |
|---|---|---|---|---|---|---|---|---|---|
| | Al | Zr | Mg | B | Others* | | | | |
| 1 | 0.14 | 0.040 | 0.47 | — | 87 | 0.73 | 6.5 | 0.79 | 0.17 |
| 2 | 0.13 | 0.040 | 0.47 | — | 88 | 0.33 | 14.2 | 0.31 | 0.17 |
| 3 | 0.13 | 0.040 | 0.47 | — | 88 | 0.33 | 14.2 | 0.31 | 0.17 |
| 4 | 0.13 | 0.040 | 0.47 | — | 90 | 0.33 | 13.5 | 0.31 | 0.17 |
| 5 | 0.13 | 0.040 | 0.47 | — | 89 | 0.33 | 13.5 | 0.31 | 0.17 |
| 6 | 0.13 | 0.040 | 0.47 | — | 89 | 0.73 | 6.1 | 0.79 | 0.17 |
| 7 | 0.13 | 0.040 | 0.47 | — | 88 | 0.33 | 12.7 | 0.31 | 0.17 |
| 8 | 0.13 | 0.040 | 0.47 | — | 89 | 0.33 | 13.5 | 0.31 | 0.17 |
| 9 | 0.13 | 0.040 | 0.47 | — | 84 | 1.72 | 4.1 | 1.92 | 0.20 |
| 10 | 0.13 | 0.040 | 0.74 | — | 87 | 0.35 | 15.8 | 0.32 | 0.17 |
| 11 | 0.14 | 0.040 | 0.47 | — | 87 | 0.34 | 13.1 | 0.29 | 0.24 |
| 12 | 0.13 | 0.040 | 0.47 | — | 89 | 0.33 | 15.3 | 0.30 | 0.17 |
| 13 | 0.13 | 0.040 | 0.47 | — | 90 | 0.33 | 13.5 | 0.31 | 0.17 |
| 14 | 0.13 | 0.040 | 0.47 | — | 87 | 0.33 | 14.3 | 0.31 | 0.17 |

TABLE 1-continued

| | C | Si | Mn | B | Others* | A value | (Ti + Mn)/Si | Metal silicon | SiO₂ |
|---|---|---|---|---|---|---|---|---|---|
| 15 | 0.13 | 0.040 | 0.47 | — | 88 | 0.73 | 6.1 | 0.81 | 0.17 |
| 16 | 0.13 | 0.040 | 0.47 | — | 89 | 0.33 | 13.6 | 0.31 | 0.17 |
| 17 | 0.12 | 0.200 | 0.47 | — | 89 | 0.31 | 13.7 | 0.35 | 0.05 |
| 18 | 0.14 | 0.043 | 0.47 | — | 88 | 0.33 | 14.3 | 0.31 | 0.17 |
| 19 | 0.13 | 0.044 | 0.47 | — | 88 | 0.33 | 14.2 | 0.32 | 0.17 |
| 20 | 0.13 | 0.040 | 0.47 | — | 88 | 0.74 | 6.0 | 0.82 | 0.17 |
| 21 | 0.13 | 0.245 | 0.47 | — | 90 | 0.30 | 13.7 | 0.34 | 0.05 |
| 22 | 0.13 | 0.040 | 0.47 | — | 88 | 0.33 | 13.7 | 0.31 | 0.17 |
| 23 | 0.13 | 0.040 | 0.47 | — | 88 | 0.32 | 14.6 | 0.30 | 0.17 |
| 24 | 0.35 | 0.040 | 0.47 | — | 88 | 0.68 | 5.7 | 0.72 | 0.17 |
| 25 | 0.13 | 0.040 | 0.47 | 0.004 | 90 | 0.32 | 13.7 | 0.30 | 0.17 |
| 26 | 0.14 | 0.040 | 0.47 | — | 88 | 0.72 | 6.2 | 0.80 | 0.17 |
| 27 | 0.13 | 0.038 | 0.47 | — | 88 | 0.33 | 13.4 | 0.31 | 0.17 |
| 28 | 0.45 | 0.038 | 0.47 | — | 89 | 0.67 | 5.8 | 0.71 | 0.17 |
| 29 | 0.13 | 0.038 | 0.47 | 0.005 | 89 | 0.32 | 13.7 | 0.30 | 0.17 |

*Others: Iron and inevitable impurities

TABLE 2

| Welding material number | Chemical composition (in mass percent) of welding material | | | | | | | | | | | |
|---|---|---|---|---|---|---|---|---|---|---|---|---|
| | C | Si | Mn | Ni | Mo | Ti | N | O | Cr | V | Nb | Cu |
| 30 | 0.10 | 2.55 | 2.2 | 0.55 | 0.14 | 3.26 | 0.002 | 2.40 | — | — | — | — |
| 31 | 0.10 | 0.34 | 2.6 | 2.42 | 0.15 | 4.46 | 0.002 | 2.32 | — | — | — | — |
| 32 | 0.10 | 0.40 | 2.6 | 2.42 | 0.14 | 2.43 | 0.002 | 2.40 | — | — | — | — |
| 33 | 0.13 | 2.04 | 3.8 | 2.55 | 1.00 | 4.56 | 0.002 | 1.75 | — | — | — | — |
| 34 | 0.10 | 0.82 | 1.1 | 1.65 | 0.33 | 3.26 | 0.002 | 2.40 | — | — | — | — |
| 35 | 0.10 | 0.40 | 2.2 | 0.20 | 0.15 | 3.26 | 0.002 | 2.40 | 0.80 | — | — | — |
| 36 | 0.10 | 0.41 | 2.6 | 2.42 | 0.15 | 3.26 | 0.002 | 2.40 | — | — | — | — |
| 37 | 0.10 | 0.38 | 2.6 | 2.42 | 0.15 | 3.26 | 0.002 | 2.49 | — | — | — | — |
| 38 | 0.10 | 0.47 | 2.6 | 2.42 | 0.15 | 3.26 | 0.002 | 2.55 | — | — | — | — |
| 39 | 0.10 | 0.34 | 2.6 | 2.42 | 0.15 | 4.46 | 0.002 | 2.32 | — | — | — | — |
| 40 | 0.03 | 0.41 | 2.6 | 2.42 | 0.15 | 3.26 | 0.002 | 2.40 | — | — | — | — |
| 41 | 0.20 | 0.41 | 2.2 | 0.60 | 0.15 | 3.26 | 0.002 | 2.40 | — | — | — | — |
| 42 | 0.10 | 0.15 | 3.3 | 2.42 | 0.15 | 3.26 | 0.002 | 2.05 | — | — | — | — |
| 43 | 0.10 | 0.41 | 2.2 | 3.65 | 0.15 | 3.26 | 0.002 | 2.40 | — | — | — | — |
| 44 | 0.10 | 0.41 | 2.6 | 2.70 | 0.15 | 3.26 | 0.002 | 2.40 | — | 0.65 | — | — |
| 45 | 0.10 | 0.41 | 2.6 | 2.75 | 0.15 | 3.26 | 0.002 | 2.40 | — | — | 0.16 | — |
| 46 | 0.08 | 0.36 | 2.0 | 2.55 | 0.15 | 3.26 | 0.002 | 0.00 | — | — | — | — |
| 47 | 0.10 | 0.41 | 2.2 | 0.55 | 0.05 | 3.26 | 0.002 | 2.05 | 0.80 | — | — | — |
| 48 | 0.10 | 0.41 | 2.2 | 0.53 | 1.67 | 3.26 | 0.002 | 2.40 | — | — | — | — |
| 49 | 0.08 | 0.41 | 2.5 | 2.70 | 0.14 | 3.26 | 0.002 | 2.40 | — | — | — | — |
| 50 | 0.10 | 0.38 | 2.6 | 2.42 | 0.15 | 4.88 | 0.002 | 2.33 | — | — | — | — |
| 51 | 0.10 | 0.41 | 2.2 | 0.56 | 0.14 | 3.26 | 0.002 | 2.40 | 2.20 | — | — | — |
| 52 | 0.10 | 0.41 | 2.2 | 0.52 | 0.14 | 3.26 | 0.002 | 2.40 | — | — | — | 1.20 |
| 53 | 0.10 | 0.40 | 2.2 | 0.52 | 0.14 | 3.26 | 0.002 | 2.40 | 0.85 | — | — | — |

| Welding material number | Chemical composition (in mass percent) of welding material | | | | | (Ti + Mn)/ A value | Metal Si | silicon | SiO₂ |
|---|---|---|---|---|---|---|---|---|---|
| | Al | Zr | Mg | B | Others* | A value | (Ti+Mn)/Si | Metal silicon | SiO₂ |
| 30 | 0.13 | 0.040 | 0.47 | — | 88 | 2.06 | 2.1 | 2.45 | 0.17 |
| 31 | 0.45 | 0.280 | 0.74 | — | 86 | 0.30 | 20.6 | 0.25 | 0.15 |
| 32 | 0.13 | 0.040 | 0.47 | — | 89 | 0.31 | 12.5 | 0.30 | 0.17 |
| 33 | 0.13 | 0.040 | 0.47 | — | 84 | 1.73 | 4.1 | 1.92 | 0.20 |
| 34 | 0.08 | 0.040 | 0.47 | — | 90 | 0.66 | 5.3 | 0.72 | 0.17 |
| 35 | 0.13 | 0.032 | 0.47 | — | 90 | 0.32 | 13.7 | 0.30 | 0.17 |
| 36 | 0.13 | 0.040 | 0.38 | — | 88 | 0.33 | 14.2 | 0.31 | 0.17 |
| 37 | 0.13 | 0.040 | 0.47 | — | 88 | 0.31 | 15.3 | 0.24 | 0.24 |
| 38 | 0.13 | 0.040 | 0.47 | — | 88 | 0.38 | 12.4 | 0.31 | 0.27 |
| 39 | 0.13 | 0.040 | 0.74 | — | 87 | 0.29 | 20.6 | 0.25 | 0.15 |
| 40 | 0.13 | 0.040 | 0.47 | — | 88 | 0.33 | 14.2 | 0.31 | 0.17 |
| 41 | 0.13 | 0.040 | 0.47 | — | 90 | 0.33 | 13.5 | 0.31 | 0.17 |
| 42 | 0.13 | 0.040 | 0.47 | — | 88 | 0.12 | 43.7 | 0.15 | 0.00 |
| 43 | 0.13 | 0.040 | 0.47 | — | 87 | 0.33 | 13.3 | 0.31 | 0.17 |
| 44 | 0.14 | 0.044 | 0.47 | — | 87 | 0.33 | 14.2 | 0.31 | 0.17 |
| 45 | 0.13 | 0.044 | 0.47 | — | 88 | 0.33 | 14.2 | 0.31 | 0.17 |
| 46 | 0.01 | 0.315 | 0.00 | — | 91 | 0.27 | 14.4 | 0.36 | 0.00 |
| 47 | 0.13 | 0.040 | 0.47 | — | 90 | 0.33 | 13.5 | 0.31 | 0.17 |
| 48 | 0.13 | 0.040 | 0.47 | — | 89 | 0.33 | 13.5 | 0.31 | 0.17 |
| 49 | 0.80 | 0.043 | 0.47 | — | 87 | 0.35 | 14.0 | 0.31 | 0.17 |
| 50 | 0.13 | 0.040 | 0.74 | — | 86 | 0.33 | 19.6 | 0.30 | 0.15 |
| 51 | 0.13 | 0.040 | 0.47 | — | 88 | 0.33 | 13.5 | 0.31 | 0.17 |

TABLE 2-continued

| | | | | | | | | | |
|---|---|---|---|---|---|---|---|---|---|
| 52 | 0.13 | 0.040 | 0.47 | — | 89 | 0.33 | 13.5 | 0.31 | 0.17 |
| 53 | 0.13 | 0.038 | 0.47 | 0.006 | 89 | 0.32 | 13.7 | 0.30 | 0.17 |

*Others: Iron and inevitable impurities

[Weld Metal Preparation]

A SM490A steel sheet was processed to have a groove geometry illustrated in FIG. 1, subjected to gas-shielded arc welding under welding conditions as follows, and yielded each of weld metals.

Welding Conditions

Shielding Gas: Gas mixture containing 20% of $CO_2$ and 80% of Ar in volume percent Current, Voltage, and Welding Speed: 270 A, 29 V, and 3.0 to 4.5 mm/second Heat Input Conditions:
(A) 1.74 kJ/mm (270 A, 29 V, and 4.5 mm/second)
(B) 2.37 kJ/mm (270 A, 29 V, and 3.3 mm/second)
(C) 2.61 kJ/mm (270 A, 29 V, and 3.0 mm/second)

Preheating-interpass Temperature: 105° C. to 150° C.

Buildup Procedure: 3 layers, 13 passes

Figure 2:
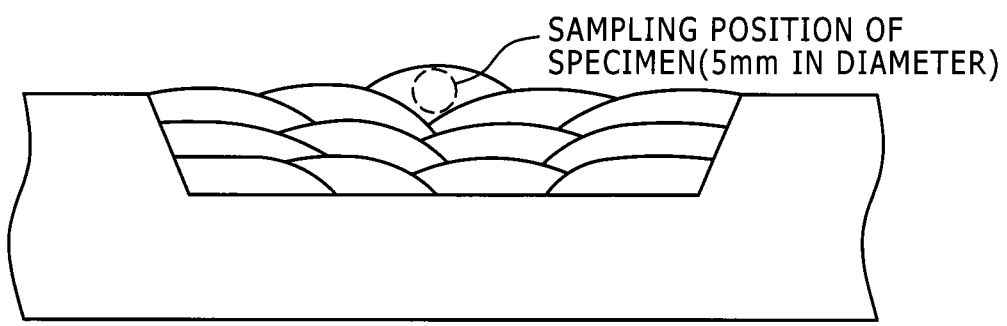
FIG. 2 is a schematic explanatory drawing illustrating where a round bar specimen is sampled.
Figure 3:
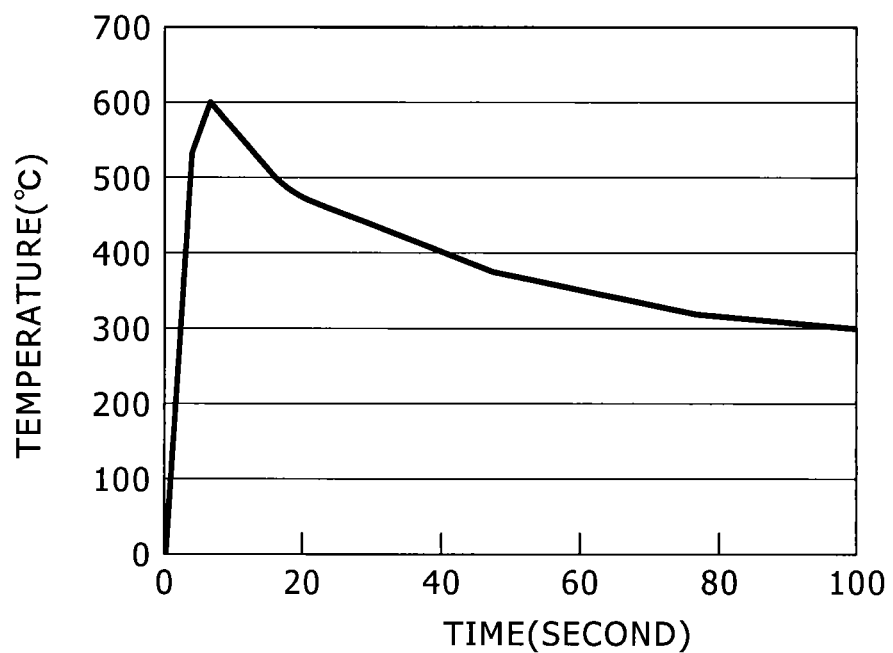
FIG. 3 is a graph illustrating how the temperature varies depending on the time in a thermal cycle simulating a reheating cycle.

A round bar specimen having a diameter of 5 mm was sampled from the final pass in each of the prepared weld metals at a position illustrated in FIG. 2 (corresponding to an as welded zone) and subjected to a thermal cycle simulating a reheating cycle. How the temperature varies depending on the time in the thermal cycle simulating a reheating cycle is illustrated in FIG. 3. The chemical compositions of the prepared weld metals, used welding materials, and heat input conditions are indicated in Tables 3 and 4 below. Contents of elements indicated by the symbol "<" in Tables 3 and 4 are of impurity levels (or less than impurity levels).

TABLE 3

| Test Number | Welding material number | Heat input condition | \multicolumn{15}{c}{Chemical composition (in mass percent) of weld metal**} |
|---|---|---|---|---|---|---|---|---|---|---|---|---|---|---|---|---|---|
| | | | C | Si | Mn | Ni | Mo | Ti | N | O | Cr | V | Nb | Cu | Al | Zr | B |
| 1 | 1 | A | 0.09 | 0.77 | 2.00 | 2.46 | 0.15 | 0.100 | 0.003 | 0.048 | <0.01 | <0.01 | <0.01 | <0.01 | <0.01 | <0.01 | <0.0008 |
| 2 | 2 | A | 0.07 | 0.31 | 1.93 | 2.37 | 0.15 | 0.061 | 0.006 | 0.043 | <0.01 | <0.01 | <0.01 | <0.01 | <0.01 | <0.01 | <0.0008 |
| 3 | 3 | A | 0.03 | 0.35 | 1.89 | 2.40 | 0.50 | 0.076 | 0.005 | 0.063 | <0.01 | <0.01 | <0.01 | <0.01 | <0.01 | <0.01 | <0.0008 |
| 4 | 4 | A | 0.08 | 0.29 | 1.55 | 0.52 | 0.15 | 0.059 | 0.004 | 0.047 | 0.4 | <0.01 | <0.01 | <0.01 | <0.01 | <0.01 | <0.0008 |
| 5 | 5 | A | 0.07 | 0.29 | 1.57 | 0.53 | 0.15 | 0.060 | 0.004 | 0.047 | 0.81 | <0.01 | <0.01 | <0.01 | <0.01 | <0.01 | <0.0008 |
| 6 | 6 | A | 0.08 | 0.71 | 1.55 | 0.55 | 0.16 | 0.057 | 0.004 | 0.046 | 0.80 | <0.01 | <0.01 | <0.01 | <0.01 | <0.01 | <0.0008 |
| 7 | 7 | B | 0.06 | 0.35 | 1.33 | 2.42 | 0.15 | 0.060 | 0.004 | 0.045 | 0.80 | <0.01 | <0.01 | <0.01 | <0.01 | <0.01 | <0.0008 |
| 8 | 8 | A | 0.11 | 0.32 | 1.54 | 0.57 | 0.15 | 0.058 | 0.004 | 0.045 | 0.68 | <0.01 | <0.01 | <0.01 | <0.01 | <0.01 | <0.0008 |
| 9 | 9 | A | 0.07 | 1.59 | 2.46 | 2.52 | 0.95 | 0.144 | 0.008 | 0.053 | <0.01 | <0.01 | <0.01 | <0.01 | <0.01 | <0.01 | <0.0008 |
| 10 | 10 | A | 0.09 | 0.33 | 2.10 | 2.75 | 0.16 | 0.125 | 0.003 | 0.046 | <0.01 | <0.01 | <0.01 | <0.01 | <0.01 | <0.01 | <0.0008 |
| 11 | 11 | A | 0.07 | 0.24 | 1.12 | 2.74 | 1.08 | 0.044 | 0.005 | 0.050 | <0.01 | <0.01 | <0.01 | <0.01 | <0.01 | <0.01 | <0.0008 |
| 12 | 12 | A | 0.08 | 0.31 | 2.24 | 0.67 | 0.15 | 0.061 | 0.004 | 0.048 | <0.01 | <0.01 | <0.01 | <0.01 | <0.01 | <0.01 | <0.0008 |
| 13 | 13 | A | 0.08 | 0.30 | 1.54 | 0.46 | 0.16 | 0.058 | 0.004 | 0.046 | 0.52 | <0.01 | <0.01 | <0.01 | <0.01 | <0.01 | <0.0008 |
| 14 | 14 | A | 0.08 | 0.31 | 1.88 | 3.21 | 0.15 | 0.058 | 0.006 | 0.046 | 0.43 | <0.01 | <0.01 | <0.01 | <0.01 | <0.01 | <0.0008 |
| 15 | 15 | A | 0.06 | 0.75 | 1.53 | 0.93 | 0.54 | 0.057 | 0.004 | 0.048 | 0.77 | <0.01 | <0.01 | <0.01 | <0.01 | <0.01 | <0.0008 |
| 16 | 16 | A | 0.08 | 0.31 | 1.59 | 1.01 | 0.08 | 0.058 | 0.004 | 0.047 | 0.80 | <0.01 | <0.01 | <0.01 | <0.01 | <0.01 | <0.0008 |
| 17 | 17 | A | 0.07 | 0.28 | 1.71 | 2.52 | 0.14 | 0.046 | 0.013 | 0.068 | <0.01 | <0.01 | <0.01 | <0.01 | <0.01 | 0.05 | <0.0008 |
| 18 | 18 | A | 0.07 | 0.29 | 1.73 | 2.36 | 0.15 | 0.070 | 0.004 | 0.034 | <0.01 | 0.39 | <0.01 | <0.01 | <0.01 | <0.01 | <0.0008 |
| 19 | 19 | A | 0.06 | 0.32 | 1.92 | 2.75 | 0.16 | 0.076 | 0.004 | 0.054 | <0.01 | <0.01 | 0.08 | <0.01 | <0.01 | <0.01 | <0.0008 |
| 20 | 20 | A | 0.07 | 0.71 | 1.54 | 0.88 | 0.15 | 0.051 | 0.005 | 0.042 | 0.92 | <0.01 | <0.01 | 0.15 | <0.01 | <0.01 | <0.0008 |
| 21 | 21 | A | 0.05 | 0.26 | 1.51 | 1.54 | 0.14 | 0.046 | 0.004 | 0.081 | <0.01 | <0.01 | <0.01 | <0.01 | <0.01 | 0.07 | <0.0008 |
| 22 | 22 | A | 0.08 | 0.28 | 1.61 | 0.55 | 0.15 | 0.058 | 0.004 | 0.046 | 1.62 | <0.01 | <0.01 | <0.01 | <0.01 | <0.01 | <0.0008 |
| 23 | 23 | A | 0.08 | 0.32 | 1.94 | 2.33 | 0.15 | 0.060 | 0.006 | 0.041 | <0.01 | 0.52 | <0.01 | <0.01 | <0.01 | <0.01 | <0.0008 |
| 24 | 24 | A | 0.09 | 0.55 | 1.26 | 1.51 | 0.32 | 0.056 | 0.005 | 0.061 | 1.11 | <0.01 | <0.01 | <0.01 | 0.015 | <0.01 | <0.0008 |
| 25 | 25 | A | 0.08 | 0.26 | 1.55 | 0.50 | 0.15 | 0.058 | 0.004 | 0.046 | 0.50 | <0.01 | <0.01 | <0.01 | <0.01 | <0.01 | 0.0018 |
| 26 | 26 | A | 0.08 | 0.75 | 1.99 | 2.41 | 0.15 | 0.081 | 0.004 | 0.047 | <0.01 | <0.01 | 0.12 | <0.01 | <0.01 | <0.01 | <0.0008 |
| 27 | 27 | B | 0.07 | 0.30 | 1.54 | 0.85 | 0.15 | 0.051 | 0.005 | 0.038 | 0.88 | <0.01 | <0.01 | 0.62 | <0.01 | <0.01 | <0.0008 |
| 28 | 28 | A | 0.09 | 0.51 | 1.30 | 1.48 | 0.31 | 0.055 | 0.006 | 0.063 | <0.01 | <0.01 | <0.01 | <0.01 | 0.019 | <0.01 | <0.0008 |
| 29 | 29 | A | 0.08 | 0.29 | 1.54 | 0.51 | 0.15 | 0.058 | 0.004 | 0.045 | 0.80 | <0.01 | <0.01 | <0.01 | <0.01 | <0.01 | 0.0032 |

**Remainder: Iron and inevitable impurities

TABLE 4

| Test Number | Welding material number | Heat input condition | C | Si | Mn | Ni | Mo | Ti | N | O | Cr | V | Nb | Cu | Al | Zr | B |
|---|---|---|---|---|---|---|---|---|---|---|---|---|---|---|---|---|---|
| 30 | 2 | C | 0.06 | 0.28 | 1.88 | 2.35 | 0.15 | 0.056 | 0.006 | 0.043 | <0.01 | <0.01 | <0.01 | <0.01 | <0.01 | <0.01 | <0.0008 |
| 31 | 30 | A | 0.06 | 2.05 | 1.48 | 0.52 | 0.15 | 0.055 | 0.004 | 0.046 | <0.01 | <0.01 | <0.01 | <0.01 | <0.01 | <0.01 | <0.0008 |
| 32 | 31 | A | 0.08 | 0.27 | 1.95 | 2.34 | 0.15 | 0.138 | 0.004 | 0.048 | <0.01 | <0.01 | <0.01 | <0.01 | 0.018 | 0.09 | <0.0008 |
| 33 | 32 | A | 0.07 | 0.30 | 1.95 | 2.35 | 0.14 | 0.038 | 0.006 | 0.041 | <0.01 | <0.01 | <0.01 | <0.01 | <0.01 | <0.01 | <0.0008 |
| 34 | 33 | A | 0.07 | 1.58 | 2.45 | 2.54 | 0.94 | 0.153 | 0.007 | 0.052 | <0.01 | <0.01 | <0.01 | <0.01 | <0.01 | <0.01 | <0.0008 |
| 35 | 34 | A | 0.08 | 0.50 | 0.85 | 1.48 | 0.30 | 0.056 | 0.005 | 0.061 | <0.01 | <0.01 | <0.01 | <0.01 | <0.01 | <0.01 | <0.0008 |
| 36 | 35 | A | 0.08 | 0.30 | 1.55 | 0.16 | 0.15 | 0.059 | 0.004 | 0.047 | 0.80 | <0.01 | <0.01 | <0.01 | <0.01 | <0.01 | <0.0008 |

TABLE 4-continued

| Test Number | Welding material number | Heat input condition | \multicolumn{15}{c}{Chemical composition (in mass percent) of weld metal**} | | | | | | | | | | | | | | |
|---|---|---|---|---|---|---|---|---|---|---|---|---|---|---|---|---|---|
| | | | C | Si | Mn | Ni | Mo | Ti | N | O | Cr | V | Nb | Cu | Al | Zr | B |
| 37 | 36 | A | 0.08 | 0.31 | 1.92 | 2.35 | 0.15 | 0.060 | 0.006 | 0.044 | <0.01 | <0.01 | <0.01 | <0.01 | <0.01 | <0.01 | <0.0008 |
| 38 | 37 | A | 0.08 | 0.27 | 1.88 | 2.36 | 0.15 | 0.060 | 0.006 | 0.051 | <0.01 | <0.01 | <0.01 | <0.01 | <0.01 | <0.01 | <0.0008 |
| 39 | 38 | A | 0.08 | 0.33 | 1.85 | 2.34 | 0.15 | 0.061 | 0.005 | 0.048 | <0.01 | <0.01 | <0.01 | <0.01 | <0.01 | <0.01 | <0.0008 |
| 40 | 39 | A | 0.07 | 0.27 | 1.90 | 2.33 | 0.15 | 0.135 | 0.005 | 0.050 | <0.01 | <0.01 | <0.01 | <0.01 | <0.01 | <0.01 | <0.0008 |
| 41 | 40 | A | 0.01 | 0.33 | 1.93 | 2.33 | 0.16 | 0.078 | 0.005 | 0.064 | <0.01 | <0.01 | <0.01 | <0.01 | <0.01 | <0.01 | <0.0008 |
| 42 | 41 | A | 0.13 | 0.30 | 1.52 | 0.55 | 0.15 | 0.054 | 0.005 | 0.044 | <0.01 | <0.01 | <0.01 | <0.01 | <0.01 | <0.01 | <0.0008 |
| 43 | 42 | A | 0.08 | 0.08 | 2.56 | 2.34 | 0.15 | 0.062 | 0.005 | 0.048 | <0.01 | <0.01 | <0.01 | <0.01 | <0.01 | <0.01 | <0.0008 |
| 44 | 43 | A | 0.08 | 0.30 | 1.54 | 3.56 | 0.15 | 0.057 | 0.006 | 0.048 | <0.01 | <0.01 | <0.01 | <0.01 | <0.01 | <0.01 | <0.0008 |
| 45 | 44 | A | 0.10 | 0.30 | 1.91 | 2.68 | 0.15 | 0.073 | 0.005 | 0.050 | <0.01 | 0.62 | <0.01 | <0.01 | <0.01 | <0.01 | <0.0008 |
| 46 | 45 | A | 0.07 | 0.33 | 1.98 | 2.74 | 0.16 | 0.076 | 0.004 | 0.055 | <0.01 | <0.01 | 0.16 | <0.01 | <0.01 | <0.01 | <0.0008 |
| 47 | 46 | A | 0.07 | 0.28 | 1.70 | 2.53 | 0.15 | 0.055 | 0.016 | 0.112 | <0.01 | <0.01 | <0.01 | <0.01 | <0.01 | 0.11 | <0.0008 |
| 48 | 47 | A | 0.08 | 0.30 | 1.55 | 0.53 | 0.04 | 0.060 | 0.004 | 0.048 | 0.80 | <0.01 | <0.01 | <0.01 | <0.01 | <0.01 | <0.0008 |
| 49 | 48 | A | 0.08 | 0.31 | 1.58 | 0.52 | 1.57 | 0.060 | 0.004 | 0.047 | <0.01 | <0.01 | <0.01 | <0.01 | <0.01 | <0.01 | <0.0008 |
| 50 | 49 | A | 0.07 | 0.30 | 1.69 | 2.64 | 0.15 | 0.069 | 0.004 | 0.028 | <0.01 | <0.01 | <0.01 | <0.01 | 0.025 | <0.01 | <0.0008 |
| 51 | 50 | A | 0.06 | 0.26 | 1.88 | 2.34 | 0.15 | 0.156 | 0.005 | 0.048 | <0.01 | <0.01 | <0.01 | <0.01 | <0.01 | <0.01 | <0.0008 |
| 52 | 51 | A | 0.08 | 0.30 | 1.56 | 0.55 | 0.15 | 0.058 | 0.004 | 0.045 | 2.08 | <0.01 | <0.01 | <0.01 | <0.01 | <0.01 | <0.0008 |
| 53 | 52 | A | 0.09 | 0.30 | 1.58 | 0.51 | 0.15 | 0.061 | 0.004 | 0.048 | <0.01 | <0.01 | <0.01 | 1.11 | <0.01 | <0.01 | <0.0008 |
| 54 | 53 | A | 0.08 | 0.31 | 1.56 | 0.51 | 0.15 | 0.058 | 0.005 | 0.047 | 0.79 | <0.01 | <0.01 | <0.01 | <0.01 | <0.01 | 0.0052 |

**Remainder: Iron and inevitable impurities

Tensile test specimens and specimens for absorbed hydrogen content measurement (absorbed hydrogen content measurement specimens) were sampled from the specimens after heat treatment. Shapes of the tensile test specimens and the absorbed hydrogen content measurement specimens are illustrated in FIGS. 4 and 5, respectively. Hydrogen embrittlement susceptibility was evaluated using these specimens by a method below.

[Hydrogen Embrittlement Susceptibility Evaluation]

Such hydrogen charging conditions as to give diffusible hydrogen in an amount of 1.5 to 3.0 ppm were selected using the prepared absorbed hydrogen content measurement specimens. Charging conditions employed are as follows.

Aqueous Solution: (0.5-mol/L or 2.5-mol/L $H_2SO_4$)+(1-g/L KSCN), (30-g/L NaCl)+(1-g/L KSCN)

Current Density: 0.1 A/dm$^2$, 1.0 A/dm$^2$, or 5.0 A/dm$^2$

Charging Time: 24 hours

The amount of diffusible hydrogen was determined as an amount of hydrogen that is desorbed upon temperature rise up to 300° C. at a rate of temperature rise of 12° C./minute using a thermal desorption spectrometer including a quadrupole mass spectrometer (supplied by NEC ANELVA CORPORATION (now Canon ANELVA Corporation)).

Each tensile test specimen was charged with hydrogen under the conditions and subjected to galvanization by a procedure as follows so as to prevent hydrogen escaping.

Aqueous Solution: (350-g/L ZnSO$_4$.7H$_2$O)+(20.6-g/L H$_2$SO$_4$ (97%))+(60-g/L Na$_2$SO$_4$)

Galvanizing Bath Temperature: 60° C.

Current Density: 50 A/dm$^2$

Galvanization Time: 3 min

Each specimen was subjected to a test according to slow strain rate technique (SSRT) at a crosshead speed of 5.0×10$^{-3}$ mm per minute (strain rate: 6.94×10$^{-6}$ per second). When a non-hydrogen-charged control had an elongation at break of $E_0$, and a hydrogen-charged specimen had an elongation at break of $E_h$, a specimen having a hydrogen embrittlement susceptibility index S (%) as specified by Expression (5) of less than 60% was evaluated as having satisfactory hydrogen embrittlement resistance, where Expression (5) is expressed as follows:

$$S=(1-E_h/E_0)\times100(\%) \quad (5)$$

[Tensile Strength Evaluation]

A 20-degree V groove was formed in a SM490A steel sheet having a thickness of 20 mm, and welding was performed under welding conditions as follows using each of the welding materials given in Tables 1 and 2 to give a weld metal, from which a tensile test specimen according to Japanese Industrial Standard (JIS) Z2202 was sampled and subjected to a tensile test. A specimen having a tensile strength of more than 780 MPa was evaluated as acceptable.

Welding Conditions

Shielding Gas: Gas mixture of 20% of $CO_2$ and 80% of Ar in volume percent

Current, Voltage, and Welding Speed: 270 A, 29 V, and 4.5 mm/second

Heat Input: 1.74 kJ/mm

Preheating-interpass Temperature: 105° C. to 150° C.

Buildup Procedure: 8 layers, 17 passes

The number density of oxide particles each containing 20 percent by mass or more of Ti and having an equivalent circle diameter of 0.15 to 1.0 µm, and the number density and total volume fraction of retained austenite particles were measured by methods as follows.

[Measurement of Number Density of Oxide Particles]

A round bar specimen having a diameter of 5 mm was sampled from the final pass of each weld metal for SSRT test prepared in the "Weld Metal Preparation", a cross-section of which was polished to a mirror-smooth state, and images were taken in two fields of view at a 1000-fold magnification with an optical microscope. The images were analyzed by an image analysis software ("Image-Pro Plus" supplied by Media Cybernetics, Inc.), and oxide particles each having an equivalent circle diameter of 0.15 to 1.0 µm were selected, and chemical compositions at the central part of oxides in the images were analyzed by energy-dispersive x-ray spectroscopy (SEM-EDS). Of detected elements, the analytical value (in mass percent) of Ti was standardized with the total of analytical values (in mass percent) of Si, S, Ti, Mn, Al, Zr, and Mg, thereby contents (in mass percent) of Ti in oxide particles were calculated. A number density of oxide particles each containing 20 percent by mass or more of Ti and having an equivalent circle diameter of 0.15 to 1.0 µm was then calculated.

[Measurement of Number Density of Retained Austenite Particles]

The sample whose oxide particles number density had been measured was etched with a LePera reagent, and images of the etched section were taken in two fields of view at a 1000-fold magnification with an optical microscope. The images were analyzed by the image analysis software to determine and analyze white etched contrasts of retained austenite, and a number density of retained austenite particles each having an equivalent circle diameter of more than 0.15 μm was calculated based on the analysis.

[Measurement of Total Volume Fraction of Retained Austenite Particles]

The sample surface was electropolished and subjected to X-ray diffractometry with a two-dimensional micro area X-ray di Tactometer supplied by Rigaku Corporation ("RINT-RAPID II"). Integrated intensity ratios of (110), (200), (211), and (220) plane peaks of ferrite phase; and of (111), (200), (220), and (311) plane peaks of retained austenite phase were calculated, based on which a volume fraction of the retained austenite phase was calculated, and an average of the respective combinations was determined.

Results of these measurements (hydrogen embrittlement susceptibility, tensile strength, number density and volume fraction of retained austenite, and number density of oxide particles) are indicated in Tables 5 and 6 as follows.

TABLE 5

| Test number | Retained austenite Number density (number per square millimeter) | Volume fraction (%) | Number density (number per square millimeter) of oxide particles | Hydrogen embrittlement susceptibility (%) | Tensile strength (MPa) |
|---|---|---|---|---|---|
| 1 | 2701 | 5.3 | 4559 | 50 | 851 |
| 2 | 4305 | 4.6 | 12072 | 25 | 815 |
| 3 | 4643 | 4.3 | 15870 | 25 | 816 |
| 4 | 4052 | 4.7 | 11650 | 30 | 799 |
| 5 | 4136 | 4.6 | 10890 | 35 | 832 |
| 6 | 2533 | 5.2 | 4643 | 45 | 879 |
| 7 | 3377 | 4.8 | 11396 | 30 | 866 |
| 8 | 4390 | 5.5 | 11903 | 30 | 871 |
| 9 | 3883 | 6.9 | 4052 | 35 | 952 |
| 10 | 4896 | 5.0 | 12240 | 15 | 873 |
| 11 | 4052 | 4.2 | 11903 | 35 | 855 |
| 12 | 5994 | 5.0 | 13338 | 10 | 895 |
| 13 | 4136 | 4.8 | 11734 | 20 | 812 |
| 14 | 4305 | 4.7 | 12240 | 30 | 879 |
| 15 | 2701 | 5.5 | 4812 | 45 | 910 |
| 16 | 4727 | 5.1 | 11227 | 25 | 815 |
| 17 | 4559 | 5.3 | 10130 | 20 | 887 |
| 18 | 2617 | 4.9 | 8779 | 30 | 878 |
| 19 | 5234 | 4.6 | 13844 | 20 | 829 |
| 20 | 2870 | 5.2 | 4559 | 45 | 891 |
| 21 | 2786 | 4.6 | 6500 | 25 | 784 |
| 22 | 4136 | 4.7 | 12072 | 30 | 920 |
| 23 | 3292 | 4.7 | 11227 | 35 | 923 |
| 24 | 2533 | 5.3 | 4305 | 50 | 912 |
| 25 | 3799 | 4.6 | 11903 | 35 | 826 |
| 26 | 2701 | 4.9 | 4643 | 45 | 953 |
| 27 | 3208 | 4.7 | 10046 | 35 | 882 |
| 28 | 2955 | 5.2 | 4643 | 40 | 799 |
| 29 | 4052 | 4.8 | 12156 | 30 | 859 |

TABLE 6

| Test number | Retained austenite Number density (number per square millimeter) | Volume fraction (%) | Number density (number per square millimeter) of oxide particles | Hydrogen embrittlement susceptibility (%) | Tensile strength (MPa) |
|---|---|---|---|---|---|
| 30 | 2786 | 3.8 | 12578 | 70 | 804 |
| 31 | 1351 | 7.0 | 3039 | 65 | 1128 |
| 32 | 2701 | 3.6 | 8864 | 80 | 845 |
| 33 | 1520 | 3.8 | 3208 | 95 | 806 |
| 34 | 2955 | 6.7 | 4812 | 90 | 1062 |
| 35 | 675 | 3.9 | 4305 | 70 | 773 |
| 36 | 2701 | 3.7 | 12747 | 65 | 771 |
| 37 | 2870 | 3.7 | 11903 | 80 | 822 |
| 38 | 2786 | 3.8 | 14182 | 75 | 811 |
| 39 | 2870 | 3.9 | 11227 | 80 | 818 |
| 40 | 2701 | 3.5 | 15617 | 70 | 833 |
| 41 | 1520 | 3.1 | 15111 | 85 | 768 |
| 42 | 4643 | 6.9 | 11650 | 85 | 1002 |
| 43 | 1351 | 3.5 | 17052 | 95 | 995 |
| 44 | 3546 | 4.7 | 11481 | 90 | 988 |
| 45 | 3630 | 4.6 | 11818 | 90 | 1151 |
| 46 | 4136 | 4.8 | 13591 | 90 | 1173 |
| 47 | 929 | 3.8 | 3208 | 95 | 1058 |
| 48 | 4221 | 4.8 | 11818 | 30 | 748 |
| 49 | 4305 | 4.6 | 12072 | 80 | 1032 |
| 50 | 1520 | 5.2 | 3799 | 65 | 829 |
| 51 | 4896 | 4.6 | 15617 | 70 | 984 |
| 52 | 3799 | 4.8 | 11227 | 85 | 1065 |
| 53 | 4390 | 4.8 | 12325 | 80 | 969 |
| 54 | 4981 | 5.4 | 11143 | 85 | 988 |

The results indicate as follows, where numbers (Nos.) refer to test numbers given in Tables 3 to 6. Nos. 1 to 29 (Tables 3 and 5) were samples satisfying conditions specified in the present invention, had chemical compositions and number density and total volume fraction of retained austenite particles as suitably controlled, and gave weld metals having high strengths and satisfactory hydrogen embrittlement resistance. Among them, samples having a number density of oxide particles of 5000 per square millimeter or more (Nos. 2 to 5, 7, 8, 10 to 14, 16 to 19, 21 to 23, 25, 27, and 29) gave weld metals having extremely low hydrogen embrittlement susceptibility.

In contrast, Nos. 30 to 54 were samples not satisfying one or more of the conditions specified in the present invention and deteriorated in at least one of tensile strength and hydrogen embrittlement resistance.

No. 30 was a sample undergone welding under an unsuitable heat input condition, had a low total volume fraction of retained austenite particles and suffered from high hydrogen embrittlement susceptibility (poor hydrogen embrittlement resistance). No. 31 was a sample of weld metal having an excessively high Si content, had an excessively high tensile strength, and suffered from high hydrogen embrittlement susceptibility. No. 32 had a low total volume fraction of retained austenite particles (due to insufficient Si content in the welding material) and suffered from high hydrogen embrittlement susceptibility.

No. 33 was a sample of weld metal having an insufficient Ti content, had a low number density of retained austenite particles and high hydrogen embrittlement susceptibility. No. 34 was a sample of weld metal having an excessively high Ti content and had high hydrogen embrittlement susceptibility due to an excessively high tensile strength. No. 35 was a sample of weld metal having an insufficient Mn content, had a low tensile strength and a low total volume fraction of retained austenite particles (due to an insufficient Al content in the welding material), and suffered from high hydrogen embrittlement susceptibility.

No. 36 was a sample of weld metal having an insufficient Ni content, had a low tensile strength and a low total volume fraction of retained austenite particles (due to an insufficient Zr content in the welding material), and suffered from high hydrogen embrittlement susceptibility. No. 37 had a low total volume fraction of retained austenite particles (due to an insufficient Mg content in the welding material) and suffered from high hydrogen embrittlement susceptibility.

No. 38 had a low total volume fraction of retained austenite particles (due to an insufficient metal Si content in the welding material) and suffered from high hydrogen embrittlement susceptibility. No. 39 had a low total volume fraction of retained austenite particles (due to an excessively high $SiO_2$ content in the welding material) and suffered from high hydrogen embrittlement susceptibility.

No. 40 had a low total volume fraction of retained austenite particles (due to an insufficient A value of the welding material) and suffered from high hydrogen embrittlement susceptibility. No. 41 was a sample of weld metal having an insufficient carbon content, had a low tensile strength, had a low number density and a low total volume fraction of retained austenite particles, and suffered from high hydrogen embrittlement susceptibility. No. 42 was a sample of weld metal having an excessively high carbon content and suffered from high hydrogen embrittlement susceptibility due to an excessively high tensile strength.

No. 43 was a sample of weld metal having an insufficient Si content (total Si content) and having an excessively high Mn content, had an excessively high tensile strength, a low number density and a low total volume fraction of retained austenite particles, and suffered from high hydrogen embrittlement susceptibility. No. 44 was a sample of weld metal having an excessively high Ni content and suffered from high hydrogen embrittlement susceptibility due to an excessively high tensile strength.

No. 45 was a sample of weld metal having an excessively high vanadium content and suffered from high hydrogen embrittlement susceptibility due to an excessively high tensile strength. No. 46 was a sample of weld metal having an excessively high Nb content and suffered from high hydrogen embrittlement susceptibility due to an excessively high tensile strength. No. 47 was a sample of weld metal having excessively high N, O, and Zr contents and suffered from high hydrogen embrittlement susceptibility due to an excessively high tensile strength.

No. 48 was a sample of weld metal having an insufficient Mo content and had a low tensile strength. No. 49 was a sample of weld metal having an excessively high Mo content and suffered from high hydrogen embrittlement susceptibility due to an excessively high tensile strength.

No. 50 was a sample of weld metal having an insufficient oxygen content and an excessively high Al content, had a low number density of retained austenite particles, and suffered from high hydrogen embrittlement susceptibility. No. 51 was a sample of weld metal having an excessively high Ti content and suffered from high hydrogen embrittlement susceptibility due to an excessively high tensile strength.

No. 52 was a sample of weld metal having an excessively high Cr content and suffered from high hydrogen embrittlement susceptibility due to an excessively high tensile strength. No. 53 was a sample of weld metal having an excessively high Cu content and suffered from high hydrogen embrittlement susceptibility due to an excessively high tensile strength. No. 54 was a sample of weld metal having an excessively high boron content and suffered from high hydrogen embrittlement susceptibility due to an excessively high tensile strength.

Experimental Example 2

Weld metals were prepared by the procedure of Experimental Example 1 using flux-cored wires (welding materials) having a wire diameter of 1.2 mm and a flux filling rate of 13.5% and having chemical compositions given in Table 7 below (among them, Nos. 2, 4, 15, 16, 21, and 24 are as in Table 1) while employing the heat input condition A. Properties (tensile strength and hydrogen embrittlement susceptibility) of the weld metals were evaluated. Elements indicated by "-" in Table 7 were not added (not contained).

TABLE 7

| Welding material number | Chemical composition (in mass percent) of welding material | | | | | | | | | | | | |
|---|---|---|---|---|---|---|---|---|---|---|---|---|---|
| | C | Si | Mn | Ni | Mo | Ti | N | O | Cr | V | Nb | Cu | Al |
| 2 | 0.10 | 0.41 | 2.6 | 2.42 | 0.15 | 3.26 | 0.002 | 2.40 | — | — | — | — | 0.13 |
| 4 | 0.10 | 0.41 | 2.2 | 0.55 | 0.15 | 3.26 | 0.002 | 2.40 | 0.42 | — | — | — | 0.13 |
| 15 | 0.08 | 0.90 | 2.2 | 1.00 | 0.55 | 3.26 | 0.002 | 2.40 | 0.80 | — | — | — | 0.13 |
| 16 | 0.11 | 0.41 | 2.2 | 1.13 | 0.09 | 3.26 | 0.002 | 2.40 | 0.80 | — | — | — | 0.13 |
| 21 | 0.07 | 0.37 | 1.8 | 1.55 | 0.14 | 3.26 | 0.002 | 2.05 | — | — | — | — | 0.13 |
| 24 | 0.11 | 0.82 | 1.4 | 1.60 | 0.33 | 3.26 | 0.002 | 2.40 | 1.15 | — | — | — | 0.35 |
| A | 0.10 | 0.41 | 2.2 | 1.13 | 0.15 | 3.26 | 0.002 | 2.40 | — | — | — | — | 0.14 |
| B | 0.10 | 0.38 | 2.2 | 1.80 | 0.15 | 3.26 | 0.002 | 2.40 | — | — | — | — | 0.14 |
| C | 0.08 | 0.41 | 2.2 | 1.32 | 0.16 | 3.26 | 0.002 | 2.40 | 0.85 | — | — | — | 0.14 |
| D | 0.10 | 0.47 | 2.2 | 1.80 | 0.16 | 3.26 | 0.002 | 2.40 | 0.75 | — | — | — | 0.14 |
| E | 0.10 | 0.41 | 1.5 | 1.80 | 0.16 | 3.26 | 0.002 | 2.40 | 1.20 | — | — | — | 0.14 |
| F | 0.80 | 0.60 | 2.2 | 1.92 | 0.16 | 3.26 | 0.002 | 2.40 | 0.75 | — | — | — | 0.14 |
| G | 0.80 | 0.41 | 1.5 | 2.13 | 0.16 | 3.26 | 0.002 | 2.40 | 0.75 | — | — | — | 0.14 |
| H | 0.10 | 0.47 | 2.2 | 1.80 | 0.06 | 3.26 | 0.002 | 2.40 | 0.75 | — | — | — | 0.14 |
| I | 0.09 | 0.41 | 2.6 | 1.13 | 0.15 | 3.26 | 0.002 | 2.40 | 0.85 | — | — | — | 0.14 |

TABLE 7-continued

| Welding material number | Chemical composition (in mass percent) of welding material | | | | (T + Mn)/ A value | Si | Metal silicon | SiO$_2$ |
|---|---|---|---|---|---|---|---|---|
| | Zr | Mg | B | Others* | | | | |
| 2 | 0.040 | 0.47 | — | 88 | 0.33 | 14.2 | 0.31 | 0.17 |
| 4 | 0.040 | 0.47 | — | 90 | 0.33 | 13.5 | 0.31 | 0.17 |
| 15 | 0.040 | 0.47 | — | 88 | 0.73 | 6.1 | 0.81 | 0.17 |
| 16 | 0.040 | 0.47 | — | 89 | 0.33 | 13.6 | 0.31 | 0.17 |
| 21 | 0.245 | 0.47 | — | 90 | 0.30 | 13.7 | 0.34 | 0.05 |
| 24 | 0.040 | 0.47 | — | 88 | 0.68 | 5.7 | 0.72 | 0.17 |
| A | 0.040 | 0.47 | — | 90 | 0.33 | 13.3 | 0.31 | 0.17 |
| B | 0.040 | 0.47 | — | 89 | 0.31 | 14.4 | 0.28 | 0.17 |
| C | 0.040 | 0.47 | — | 89 | 0.33 | 13.3 | 0.31 | 0.17 |
| D | 0.040 | 0.47 | — | 88 | 0.38 | 11.6 | 0.37 | 0.17 |
| E | 0.040 | 0.47 | — | 89 | 0.33 | 11.6 | 0.31 | 0.17 |
| F | 0.040 | 0.47 | — | 87 | 0.49 | 91 | 0.46 | 0.24 |
| G | 0.040 | 0.47 | — | 88 | 0.33 | 11.6 | 0.31 | 0.17 |
| H | 0.040 | 0.47 | — | 88 | 0.38 | 11.6 | 0.37 | 0.17 |
| I | 0.040 | 0.47 | — | 88 | 0.33 | 14.3 | 0.31 | 0.17 |

*Others: Iron and inevitable impurities

A round bar specimens was sampled from the final pass in each of the prepared weld metals at a position illustrated in FIG. 2 (corresponding to an unaffected zone) by the procedure of Experimental Example 1 and subjected to a thermal cycle simulating a reheating cycle (FIG. 3). Chemical compositions of the prepared weld metals as well as the used welding materials and heat input conditions are indicated in Table 8 as follows. Contents of elements indicated by the symbol "<" in Table 8 are of impurity levels (or less than impurity levels).

[Measurement of Low-Temperature Toughness]

A Charpy impact test specimen (JIS Z 3111 No. 4 test V-notched specimen) was sampled vertically to the weld line direction from a central part in the thickness direction of each weld metal prepared for tensile strength measurement, and an impact energy absorption at −40° C. vE$_{-40}$ of the specimen was measured by the procedure prescribed in JIS Z 2242. A sample having an average of three measurements

TABLE 8

| Test Number | Welding material number | Heat input condition | Chemical composition (in mass percent) of weld metal** | | | | | | | | | | | | | | | α value |
|---|---|---|---|---|---|---|---|---|---|---|---|---|---|---|---|---|---|---|
| | | | C | Si | Mn | Ni | Mo | Ti | N | O | Cr | V | Nb | Cu | Al | Zr | B | |
| 55 | 2 | A | 0.07 | 0.31 | 1.93 | 2.37 | 0.15 | 0.061 | 0.0059 | 0.043 | <0.01 | <0.01 | <0.01 | <0.01 | <0.01 | <0.01 | <0.0008 | 5.1 |
| 56 | 4 | A | 0.08 | 0.29 | 1.55 | 0.52 | 0.15 | 0.059 | 0.0037 | 0.047 | 0.4 | <0.01 | <0.01 | <0.01 | <0.01 | <0.01 | <0.0008 | 2.8 |
| 57 | 15 | A | 0.06 | 0.75 | 1.53 | 0.93 | 0.54 | 0.057 | 0.0042 | 0.048 | 0.77 | <0.01 | <0.01 | <0.01 | <0.01 | <0.01 | <0.0008 | 3.9 |
| 58 | 16 | A | 0.08 | 0.31 | 1.59 | 1.01 | 0.08 | 0.058 | 0.0039 | 0.047 | 0.80 | <0.01 | <0.01 | <0.01 | <0.01 | <0.01 | <0.0008 | 3.1 |
| 59 | 21 | A | 0.05 | 0.26 | 1.51 | 1.54 | 0.14 | 0.046 | 0.0042 | 0.081 | <0.01 | <0.01 | <0.01 | <0.01 | <0.01 | 0.07 | <0.0008 | 3.1 |
| 60 | 24 | A | 0.09 | 0.55 | 1.26 | 1.51 | 0.32 | 0.056 | 0.0052 | 0.061 | 1.11 | <0.01 | <0.01 | <0.01 | 0.015 | <0.01 | <0.0008 | 3.6 |
| 61 | A | A | 0.07 | 0.30 | 1.51 | 1.09 | 0.15 | 0.059 | 0.0042 | 0.048 | <0.01 | <0.01 | <0.01 | <0.01 | <0.01 | <0.01 | <0.0008 | 3.3 |
| 62 | B | A | 0.07 | 0.28 | 1.66 | 1.68 | 0.16 | 0.067 | 0.0043 | 0.050 | <0.01 | <0.01 | <0.01 | <0.01 | <0.01 | <0.01 | <0.0008 | 4.1 |
| 63 | C | A | 0.06 | 0.31 | 1.62 | 1.26 | 0.16 | 0.059 | 0.0040 | 0.047 | 0.83 | <0.01 | <0.01 | <0.01 | <0.01 | <0.01 | <0.0008 | 3.6 |
| 64 | D | A | 0.09 | 0.35 | 1.65 | 1.70 | 0.16 | 0.055 | 0.0038 | 0.050 | 0.71 | <0.01 | <0.01 | <0.01 | <0.01 | <0.01 | <0.0008 | 4.0 |
| 65 | E | A | 0.07 | 0.29 | 1.35 | 1.65 | 0.16 | 0.063 | 0.0045 | 0.050 | 1.15 | <0.01 | <0.01 | <0.01 | <0.01 | <0.01 | <0.0008 | 3.7 |
| 66 | F | A | 0.06 | 0.46 | 1.59 | 1.76 | 0.15 | 0.066 | 0.0048 | 0.051 | 0.68 | <0.01 | <0.01 | <0.01 | <0.01 | <0.01 | <0.0008 | 4.1 |
| 67 | G | A | 0.06 | 0.30 | 1.34 | 1.91 | 0.16 | 0.064 | 0.0048 | 0.049 | 0.68 | <0.01 | <0.01 | <0.01 | <0.01 | <0.01 | <0.0008 | 4.0 |
| 68 | H | A | 0.08 | 0.38 | 1.61 | 1.71 | 0.06 | 0.066 | 0.0051 | 0.048 | 0.69 | <0.01 | <0.01 | <0.01 | <0.01 | <0.01 | <0.0008 | 3.9 |
| 69 | I | A | 0.07 | 0.30 | 1.90 | 1.10 | 0.15 | 0.060 | 0.0040 | 0.050 | 0.80 | <0.01 | <0.01 | <0.01 | <0.01 | <0.01 | <0.0008 | 3.7 |

**Remainder: Iron and inevitable impurities

The prepared weld metals were examined on hydrogen embrittlement susceptibility, tensile strength, number density and volume fraction of retained austenite, and number density of oxide particles through measurements by the procedure of Experimental Example 1, and examined on low-temperature toughness through measurement by a method as follows.

of more than 85 J was evaluated as having satisfactory low-temperature toughness.

Results of these measurements (hydrogen embrittlement susceptibility, tensile strength, number density and volume fraction of retained austenite, number density of oxide particles, and low-temperature toughness) are indicated in Table 9 as follows.

TABLE 9

| Test number | Retained austenite Number density (number per square millimeter) | Retained austenite Volume fraction (%) | Number density (number per square millimeter) of oxide particles | Hydrogen embrittlement susceptibility (%) | Tensile strength (MPa) | $vE_{-40}$ (J) |
|---|---|---|---|---|---|---|
| 55 | 4305 | 4.6 | 12072 | 25 | 815 | 81 |
| 56 | 4052 | 4.7 | 11650 | 30 | 799 | 79 |
| 57 | 2701 | 5.5 | 4812 | 45 | 910 | 55 |
| 58 | 4727 | 5.1 | 11227 | 25 | 815 | 83 |
| 59 | 2786 | 4.6 | 6500 | 25 | 784 | 75 |
| 60 | 2533 | 5.3 | 4305 | 50 | 912 | 49 |
| 61 | 4305 | 5.4 | 11650 | 10 | 787 | 88 |
| 62 | 3546 | 4.7 | 12831 | 25 | 793 | 92 |
| 63 | 3799 | 4.8 | 11059 | 25 | 822 | 97 |
| 64 | 3377 | 4.8 | 11734 | 35 | 821 | 98 |
| 65 | 3377 | 4.6 | 10805 | 40 | 826 | 99 |
| 66 | 2870 | 5.0 | 4981 | 45 | 816 | 86 |
| 67 | 4052 | 5.2 | 11481 | 10 | 803 | 88 |
| 68 | 3714 | 4.9 | 10637 | 20 | 785 | 103 |
| 69 | 4474 | 5.5 | 13338 | 10 | 811 | 100 |

The results indicate as follows, where numbers (Nos.) refer to test numbers given in Tables 8 and 9. No. 55 had a Ni content out of the preferred range (1.0% to 2.0%); No. 56 had a Ni content out of the preferred range and had an α value of less than 3.2; No. 57 had Si and Ni contents both out of the preferred ranges; and No. 60 had a Si content out of the preferred range (0.10% to 0.5%). Each of these samples had insufficient low-temperature toughness. Nos. 58 and 59 had an α value as specified by Expression (1) of less than 3.2 and suffered from insufficient low-temperature toughness.

In contrast, Nos. 61 to 69 had chemical compositions and number density and total volume fraction of retained austenite particles as suitably controlled, thereby had high strengths, and exhibited excellent hydrogen embrittlement resistance. In addition, they had Si and Ni contents within the preferred ranges and had an α value as specified by Expression (1) of 3.2 or more, and exhibited satisfactory low-temperature toughness.

While the present invention has been described in detail with reference to preferred embodiments thereof with a certain degree of particularity, it will be understood by those skilled in the art that various changes and modifications are possible without departing from the spirit and scope of the invention.

The present application is based on Japanese Patent Application No. 2011-021153 filed on Feb. 2, 2011 and Japanese Patent Application No. 2011-184117 filed on Aug. 25, 2011, the entire contents of which are incorporated herein by reference.

INDUSTRIAL APPLICABILITY

Weld metals according to embodiments of the present invention are usable in various welded structures and are applicable to offshore structures.

The invention claimed is:

1. A weld metal formed by gas-shielded arc welding with a flux-cored, wire, the weld metal comprising:
   in mass percent,
   C in a content of from 0.02% to 0.12%;
   Si in a content of from 0.10% to 2.0%;
   Mn in a content of from 0.90% to 2.5%;
   Ni in a content of from 0.20% to 3.5%;
   Mo in a content of from 0.05% to 1.5%;
   Ti in a content of from 0.040% to 0.150%;
   N in a content of more than 0% and less than or equal to 0.015%;
   O in a content of from 0.030% to 0.10%; and
   iron,
   wherein
   the weld metal comprises retained austenite particles, which are present in a number density of 2500 per square millimeter or more, and in a total volume fraction of 4.0% or more based on a total volume of entire structures of the weld metal.

2. The weld metal of claim 1, wherein the weld metal has a Si content of from 0.10% to 0.5%, a Ni content of from 1.0% to 2.0%, and an α value as specified by Expression (1) of 3.2 or more:

$$\alpha \text{ value} = [Mn] \pm [Ni] \pm (2 \times [Mo]) \pm (16 \times [Ti]) - (12 \times [O]) \quad (1),$$

wherein [Mn], [Ni], [Mo], [Ti], and [O] are contents, in mass percent, of Mn, Ni, Mo, Ti, and O, respectively.

3. The weld metal of claim 1, wherein oxide particles each comprising 20 percent by mass or more of Ti and having an equivalent circle diameter of from 0.15 to 1.0 μm are present in a number density of 5000 per square millimeter or more.

4. The weld metal of claim 1, further comprising at least one element selected from the group consisting of
   Cr in a content of more than 0% and less than or equal to 2.0%,
   V in a content of more than 0% and less than or equal to 0.60%,
   Nb in a content of more than 0% and less than or equal to 0.15%, and
   Cu in a content of more than 0% and less than or equal to 1.0%.

5. The weld metal of claim 1, further comprising at least one element selected from the group consisting of
   Al in a content of more than 0% and less than or equal to 0.020% and
   Zr a content of more than 0% and less than or equal to 0.10%.

6. The weld metal of claim 1, further comprising
   B in a content of more than 0% and less than or equal to 0.0050%.

7. The weld metal of claim 2, wherein oxide particles each comprising 20 percent by mass or more of Ti and having an equivalent circle diameter of from 0.15 to 1.0 μm are present in a number density of 5000 per square millimeter or more.

8. The weld metal of claim 2, further comprising at least one element selected from the group consisting of
Cr in a content of more than 0% and less than or equal to 2.0%,
V in a content of more than 0% and less than or equal to 0.60%,
Nb in a content of more than 0% and less than or equal to 0.15%, and
Cu in a content of more than 0% and less than or equal to 1.0%.

9. The weld metal of claim 3, further comprising at least one element selected from the group consisting of
Cr in a content of more than 0% and less than or equal to 2.0%,
V in a content of more than 0% and less than or equal to 0.60%,
Nb in a content of more than 0% and less than or equal to 0.15%, and
Cu in a content of more than 0% and less than or equal to 1.0%.

10. The weld metal of claim 2, further comprising at least one element selected from the group consisting of
Al in a content of more than 0% and less than or equal to 0.020% and
Zr in a content of more than 0% and less than or equal to 0.10%.

11. The weld metal of claim 3, further comprising at least one element selected from the group consisting of
Al in a content of more than 0% and less than or equal to 0.020% and
Zr in a content of more than 0% and less than or equal to 0.10%.

12. The weld metal of claim 4, further comprising at least one element selected from group consisting of
Al in a content of more than 0% and less than or equal to 0.020% and
Zr in a content of more than 0% and less than or equal to 0.10%.

13. The weld metal of claim 2, further comprising
B in a content of more than 0% and less than or equal to 0.0050%.

14. The weld metal of claim 3, further comprising
B in a content of more than 0% and less than or equal to 0.0050%.

15. The weld metal of claim 4, further comprising
B in a content of more than 0% and less than or equal to 0.0050%.

16. The weld metal of claim 5, further comprising
B in a content of more than 0% and less than or equal to 0.0050%.

17. The weld metal of claim 1, further comprising P and S as inevitable impurities.

18. The weld metal of claim 17, wherein
P is present in a content of more than 0 and less than or equal to 0.02% and
S is present in a content of more than 0 and less than or equal to 0.025%.

* * * * *